United States Patent
Aksyuk et al.

[11] Patent Number: 6,108,466
[45] Date of Patent: Aug. 22, 2000

[54] MICRO-MACHINED OPTICAL SWITCH WITH TAPERED ENDS

[75] Inventors: Vladimir A. Aksyuk, Piscataway; David J. Bishop, Summit; C. Randy Giles, Whippany, all of N.J.

[73] Assignee: Lucent Technologies, Murray Hill, N.J.

[21] Appl. No.: 09/154,797

[22] Filed: Sep. 17, 1998

[51] Int. Cl.[7] .................................................. G02B 6/26
[52] U.S. Cl. .............................. 385/19; 385/15; 385/16; 385/20; 385/21; 385/24
[58] Field of Search ................................. 385/15, 16, 17, 385/18, 19, 20, 21, 22, 24, 47

[56] References Cited

U.S. PATENT DOCUMENTS

| | | | |
|---|---|---|---|
| 3,874,779 | 4/1975 | Thiel | 385/43 X |
| 4,836,636 | 6/1989 | Obara et al. | 385/19 X |
| 4,932,745 | 6/1990 | Blonder | 385/18 X |
| 5,481,631 | 1/1996 | Cahill et al. | 385/18 |
| 5,742,712 | 4/1998 | Pan et al. | 385/18 |
| 5,923,798 | 7/1999 | Aksyuk et al. | 385/19 |
| 5,963,367 | 10/1999 | Aksyuk et al. | 359/392 |
| 6,005,993 | 12/1999 | MacDonald | 385/16 |

FOREIGN PATENT DOCUMENTS

| | | | |
|---|---|---|---|
| 56-24304 | 3/1981 | Japan | 385/18 X |
| 56-74204 | 6/1981 | Japan | 385/18 X |

*Primary Examiner*—Brian Healy

[57] ABSTRACT

One-by-three and two-by-two optical switches comprising optical waveguides or fibers with tapered ends that utilize electrostatically-driven actuators are disclosed. Tapering of the fiber ends allow the ends to be positioned in close proximity to one another to yield an optical switch with low insertion loss. In one embodiment the optical switch comprises: (1) four optical waveguides each having a tapered end comprising two tapered edges and disposed on a support such that each tapered edge of each waveguide is in opposed and near-abutting relation with a tapered edge of another optical waveguide, said near abutment defining a space between each pair of opposes tapered edges; (2) a first electromechanical actuator operable to move at least a first optical device into and out of a path of an optical signal travelling between two of the waveguides, wherein the first optical device moves in the space between a first pair of opposed tapered edges; and (3) a second electromechanical actuator operable to move at least a second optical device into and out of the path of the optical signal, wherein the second optical device moves in the space between a second pair of opposed tapered edges, wherein one tapered edge of the first pair and one tapered edge of the second pair are common to one of the optical waveguides.

17 Claims, 9 Drawing Sheets

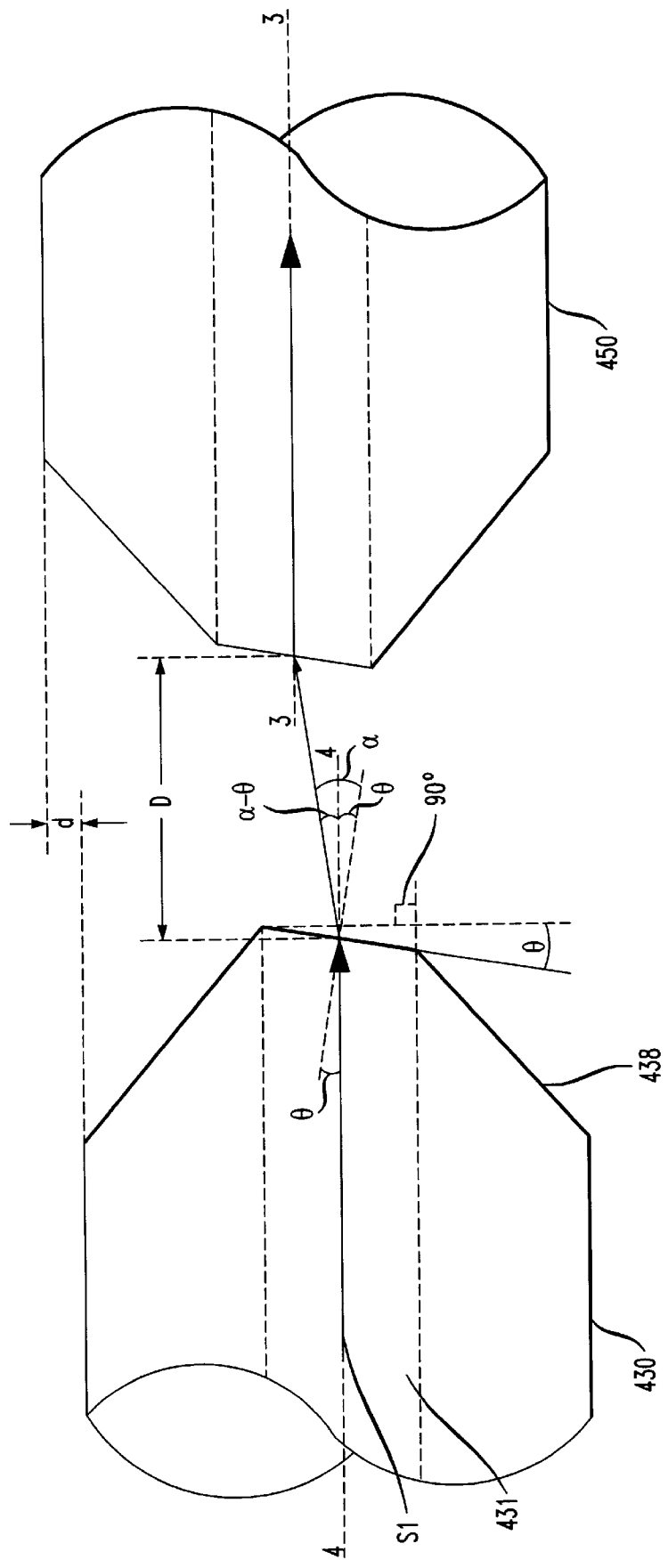

500

500

500

700

700

700

MICRO-MACHINED OPTICAL SWITCH WITH TAPERED ENDS

FIELD OF THE INVENTION

The present invention relates to an optical switch in general, and, more particularly, to a micro-machined optical switch.

BACKGROUND OF THE INVENTION

Electronically controlled micro-machined optical switches can be used to interrupt or redirect light output from an optical fiber. Such switches can be used in a variety of different applications in an optical communications system. For example, a low insertion loss optical switch with a high contrast ratio could be connected to optical fibers to allow a variety of adaptive, reconfigurable networks to be designed and constructed. Such switch would be used to direct light from a source fiber to different destination fibers. In the absence of additional focusing elements, the insertion loss of such a switch increases as the number of source and destination fibers increase. Such an increase in insertion loss is due to geometric constraints associated with standard optical fiber construction.

As an illustration of the above-described problem, consider an arrangement of four optical fibers, wherein the fibers are arranged end-to-end in pairs, with a gap between each pair of fiber ends. The two arrangements of paired fibers are disposed orthogonally to one another (and in the same plane) such that a gap between the fiber ends of both pairs overlap. In other words, the fibers are arranged at 0 degrees, 90 degrees, 180 degrees and 270 degrees. Since fibers are typically cleaved such that a flat or slightly angled face results, the ends of the above-described arrangement of fibers must be spaced from one another by at least one fiber diameter. Because a fiber typically consists of an optically active core having a cladding (required for support and to prevent undesired loss of light) of substantially larger diameter than such core, a gap of even one fiber diameter can represent a distance greatly exceeding the diameter of the core. Such a gap of one fiber diameter often results in an unacceptably high insertion loss due to the finite divergence of the optical signal. As such, the art would benefit from a low-insertion-loss arrangement of a micro-machined optical switch having at least four optical fibers.

SUMMARY OF THE INVENTION

One-by-three and two-by-two optical switches comprising optical waveguides or fibers with tapered ends that utilize electrically controlled actuators are disclosed. In some embodiments, the actuators are electrostatically driven. A one-by-three optical switch comprises one source fiber for transmitting an optical signal and three destination fibers for receiving the optical signal. A two-by-two optical switch comprises two source fibers for transmitting two optical signals and two destination fibers for receiving the two optical signals. Optical devices placed in an optical path between the various fibers direct the signals to appropriate destination fibers.

The fiber ends are advantageously tapered allowing such ends to be positioned suitably close to one another thereby yielding an optical switch with low insertion loss. Yet, sufficient spacing is provided between fiber ends to permit optical devices to move into and out of an optical path between such fiber ends. Linkages mechanically connect the optical devices to actuators. The disclosed actuators can move the optical devices into and out of the optical path by imparting either a vertical or horizontal motion to the optical devices.

BRIEF DESCRIPTION OF THE DRAWINGS

FIG. 4 depicts geometric details of tapered fiber ends for use in conjunction with the present optical switches.

DETAILED DESCRIPTION

Figure 1:
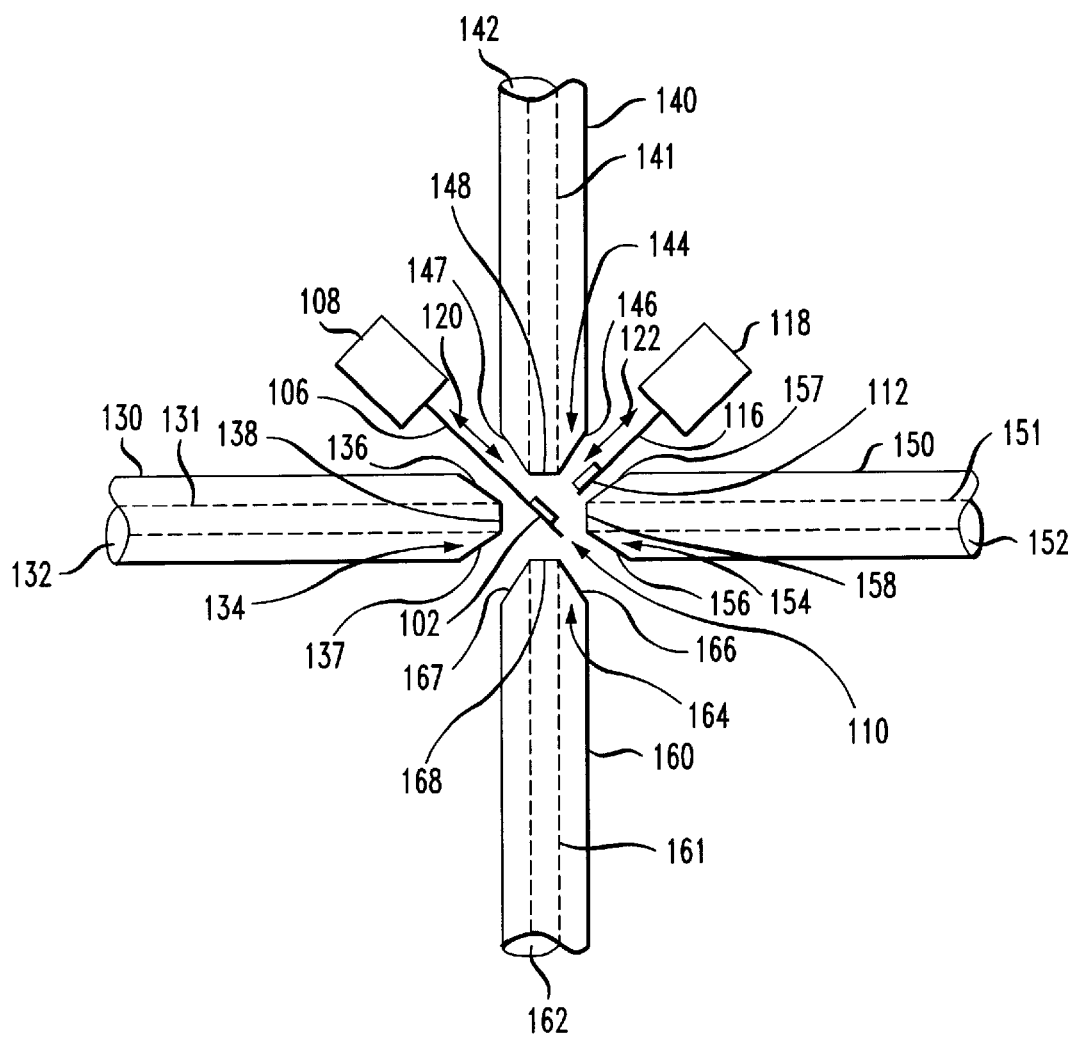
FIG. 1 depicts a schematic diagram of a one-by-three optical switch with tapered fiber ends.

FIG. 1 depicts an optical switch 100 in accordance with an illustrated embodiment of the present invention. Optical switch 100 includes four waveguides 130, 140, 150 and 160, and two signal directors 102 and 112 that are linked to respective actuators 108 and 118. Linkage 106 links signal director 102 and actuator 108, and linkage 116 links signal director 112 and actuator 118.

Actuators 108 and 118 are operable to move respective signal directors 102 and 112 in to and out of the paths of optical signals (not shown) propagating between the various waveguides in region 110. In the embodiment depicted in FIG. 1, the actuators move signal directors 102 and 112 along "in-plane" paths in a reciprocating-like manner as shown by respective vectors 120 and 122. In other embodiments, the actuators move the signal directors along an "out-of-plane" path, which, in FIG. 1, would move the signal directors "out-of-the-page." Further description of actuators suitable for providing the required functionality is described later in this specification.

Once positioned in the path of an optical signal by an actuator, signal director 102 or 112 is operable to alter the path of that optical signal. Signal directors 102 and 112 comprise structures suitable for affecting the path of an optical signal. The optical signal may be reflected, in whole or in part, or may be optically altered. Several non-limiting examples of such structures include dielectric mirrors, reflective (e.g., metalized) surfaces, dielectric filters, modulators, polarizers, attenuators and devices having a nonlinear optical response such as frequency doublers.

The four waveguides 130, 140, 150 and 160 are depicted as optical fibers in FIG. 1. For convenience, such waveguides will hereinafter be referred to as "optical fibers" or "fibers" in the Detailed Description, it being understood that in other embodiments, other optical transmission media are used. The fibers are arranged in opposed pairs, such that core end faces 138 and 158 of respective fibers 130 and 150 "face" one another, as do core end faces 148 and 168 of respective fibers 140 and 160.

Each of the four optical fibers is similarly configured. Selecting optical fiber 130 as an example, said optical fiber 130 includes a core 131, cladding 132 and, advantageously, a tapered end 134. Tapered end 134 is depicted in FIG. 1 by "slanted" lines or tapered edges 136 and 137 in cladding 132, which slant towards core end face 138 of core 131. Similarly, optical fibers 140, 150 and 160 include respective cores 141, 151 and 161, claddings 142, 152 and 162, and tapered ends 144, 154 and 164. One method for forming such tapered edges is to heat an end of an optical fiber with a laser while rotating the fiber about its lengthwise axis. It will of course be appreciated that tapered end 134, when considered in 3-dimensions, is more properly visualized as the frustum of a cone and that tapered edges 136 and 137 are simply a representation of a portion of the surface of said frustum.

Fibers, such as fibers 140–160, possessing such a tapered end can be disposed closer to one another than is possible with normally cleaved fibers. Free-space path length between such fibers is therefore reduced resulting in decreased insertion loss. Moreover, the tapered edges of such tapered ends facilitate passage of actuator linkages (e.g., linkages 106 and 116) between adjacent fibers. For example, tapered edge 136 of optical fiber 130 and tapered edge 147 of optical fiber 140 are in near-abutting relation, but spaced far enough apart to allow for passage of linkage 106 therebetween.

Figure 2:
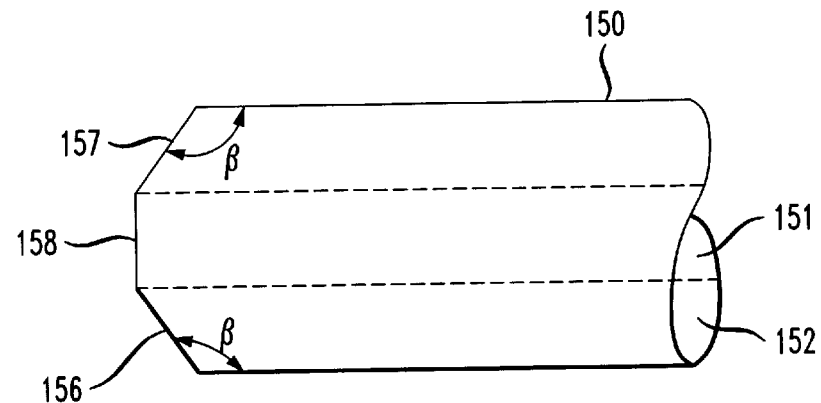
FIG. 2 depicts details of a tapered fiber end for use in conjunction with the present optical switch.

The tapered edges are advantageously configured to provide equal distances between the end faces of the cores of opposed fibers. For example, the distance between core end faces 138 and 158 (fibers 130 and 150) is desirously substantially equal to the distance between core end faces 148 and 168. Such substantially equidistant spacing is achieved by an appropriate fiber geometry. Referring to FIG. 2, which depicts a representative fiber (fiber 150) from FIG. 1, angle β subtended between a tapered edge 157 or 158 and an adjacent lengthwise outer edge of a fiber should be in a range of about 130 to about 140 degrees. As described in more detail later in this specification, the angle β may vary about the circumference of the tapered end.

In illustrative optical switch 100 depicted in FIG. 1, the core end faces of opposed fibers, such as fibers 130 and 150, are parallel to one another and orthogonal to an optical signal (not shown) passing from one of such fibers to the other fiber. Such an arrangement may result in "back reflection," wherein a portion of the optical signal incident on a core end face, such as core end face 158, is reflected back to core end face 138. Back reflection may also result within a single fiber, wherein a portion of the optical signal is reflected back into an optical core, such as optical core 131, as the optical signal exits a core end face, such as core end face 138. Such back reflections undesirably increase insertion losses. Back reflections may be reduced or eliminated by changing the configuration of the core end faces.

Figure 3:
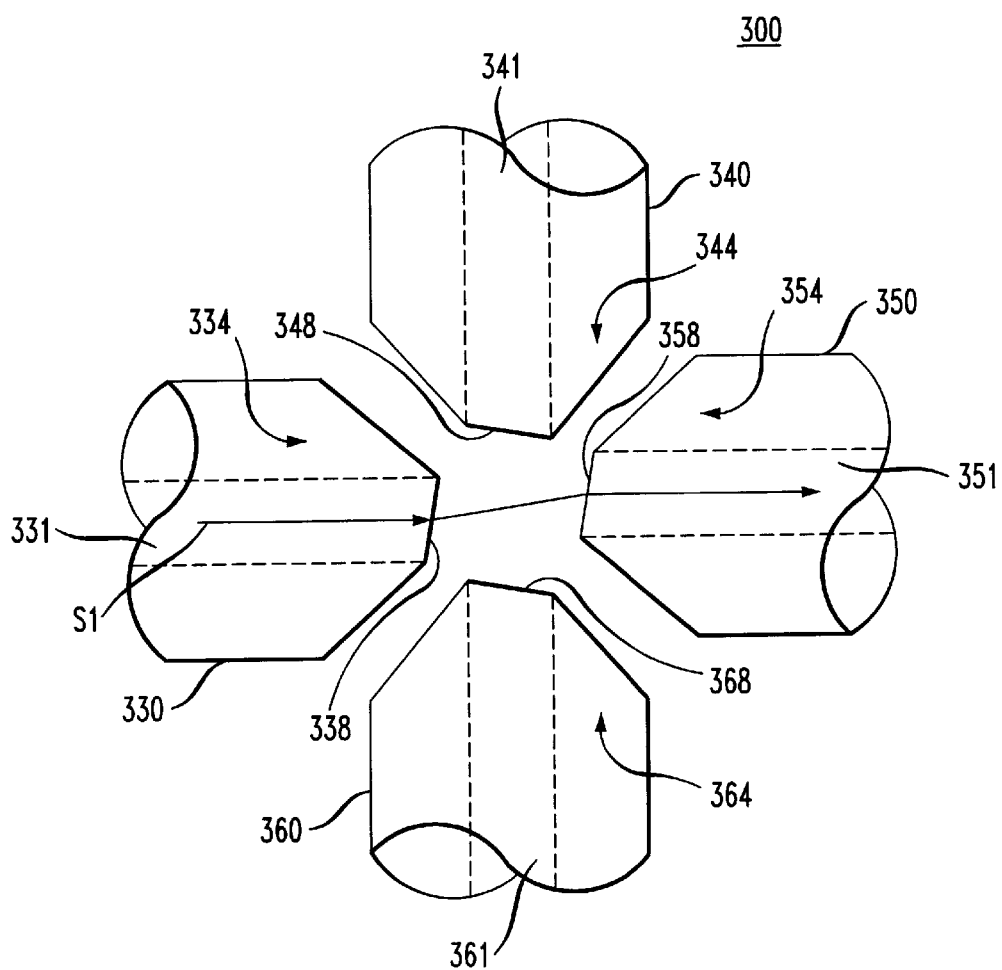
FIG. 3 depicts tapered fiber ends that are adapted for reducing back reflections.

FIG. 3 depicts illustrative optical switch 300 in accordance with the present teachings, which is physically adapted to reduce back reflections. The portion of optical switch 300 illustrated in FIG. 3 shows tapered ends 334, 344, 354 and 364 of fibers 330–360, with "slanted" core end faces 338, 348, 358 and 368. Such "slanting" reduces back reflections.

Optical signal S1 is refracted as it exits optical core 331 and is refracted again as it enters optical core 351 of fiber 350. The amount of refraction, or "bending," is defined by Snell's Law of Refraction, which is given by:

$$n_1 \cdot \sin\theta = n_2 \cdot \sin\alpha, \qquad [1]$$

where:

$n_1$ is the refractive index of the optical core;

$n_2$ is the refractive index of the media into which the signal enters;

$\theta$ is the angle of incidence; and $\alpha$ is the angle of refraction.

Assuming that the media is air, which has an index of refraction of approximately one, Snell's Law reduces to:

$$n_1 \cdot \sin\theta = \sin\alpha. \qquad [2]$$

Referring now to FIG. 4, in one embodiment, core end face 438 is slanted about 8° with respect to a "flat" face (i.e., a face that is orthogonal to signal S1) to reduce back reflection. Thus, the angle of incidence θ equals 8°. Assuming a refractive index of about 1.46 for optical core 431, the angle of refraction α is about 12°.

To account for the angled core end face of fiber 430 and the refraction of signal S1, optical axis 3—3 of destination fiber 450 must be offset from optical axis 4—4 of source fiber 430 by a distance, d. The distance d is given by:

$$d = D \cdot \sin(\alpha - \theta), \qquad [3]$$

where:

D is a distance between the centers of the optical cores of the source and destination fiber.

The distance, D, is set to be as small as possible to reduce insertion losses due to the finite divergence of the optical signal while allowing access for the signal directors between optical fibers. Thus, if D equals 20 microns and θ is 8°, then offset d is equal to about 1.7 microns.

Rather than "slanting" the core end face, in other embodiments, other geometries are used for reducing back reflection, including, for example, a rounded core end face. As will be appreciated by those skilled in the art, such a rounded end face may better serve a waveguide that does not exhibit the significant, well-defined changes in refractive index characteristic of the core/cladding arrangement of an optical fiber.

The operation of the present optical switch is now described with reference to FIGS. 5a–5c and 7a–7c. In those Figures, waveguide detail (e.g., tapering, etc.) and actuator detail is omitted for clarity of illustration.

Figure 5A:
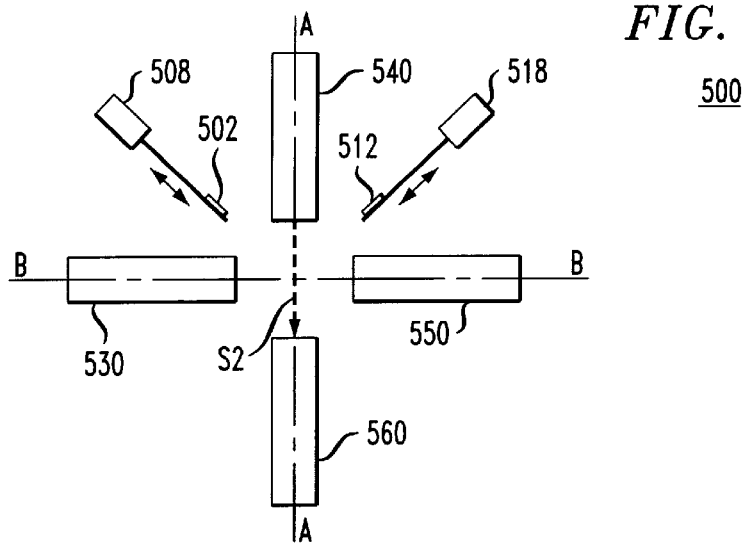
FIG. 5a depicts a conceptual drawing of a one-by-three optical switch of the present invention, showing an optical signal crossing the switch along a first optical path.
Figure 5B:
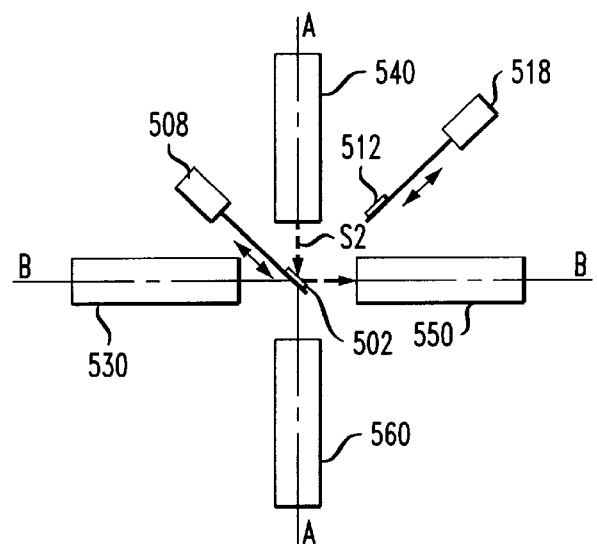
FIG. 5b depicts a conceptual drawing of the one-by-three optical switch of FIG. 5a, but showing the optical signal contacting a first optical device and being diverted from the first optical path.
Figure 5C:
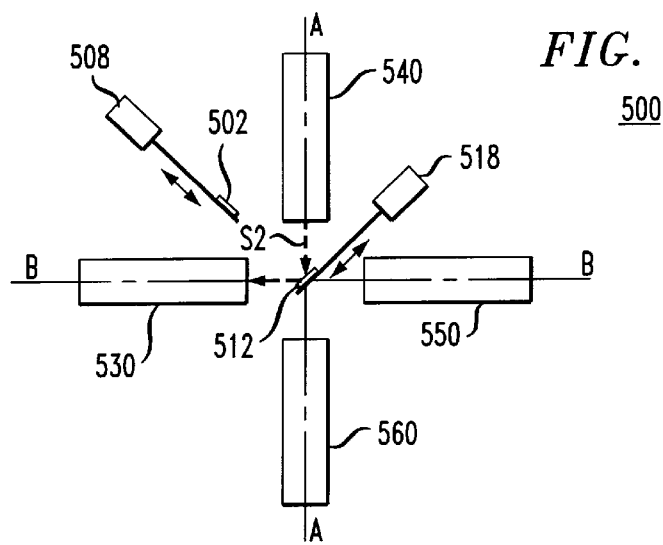
FIG. 5c depicts a conceptual drawing of the one-by-three optical switch of FIG. 5a, showing the optical signal contacting a second optical device and being diverted from the first optical path.

In a first embodiment illustrated in FIGS. 5a–5c, the present optical switch functions as a 1×3 switch. In such a switch, a signal, such as signal S2, is sourced from a single fiber, and is delivered to any one of three destination fibers. In the embodiment depicted in FIGS. 5a–5c, the source fiber is fiber 540. FIG. 5a depicts optical signal S2 traveling unimpeded along optical axis A—A from source fiber 540 to a first destination fiber 560. Optical signal S2 crosses the switch to fiber 560 because neither of signal directors 502 and 512 have been moved into the signal path defined by optical axis A—A.

In FIG. 5b, signal director 502 is introduced into the path of signal S2 via the action of linked actuator 508. Signal director 502 intercepts optical signal S2 and directs at least a portion of that signal to fiber 550 along optical axis B—B. In FIG. 5c, after signal director 502 is removed from the optical path via the action of linked actuator 508, signal director 512 is moved into said signal path via linked actuator 518. Signal director 512 intercepts optical signal S2 and directs at least a portion of said signal S2 to fiber 530 along optical axis B—B.

Figure 6:
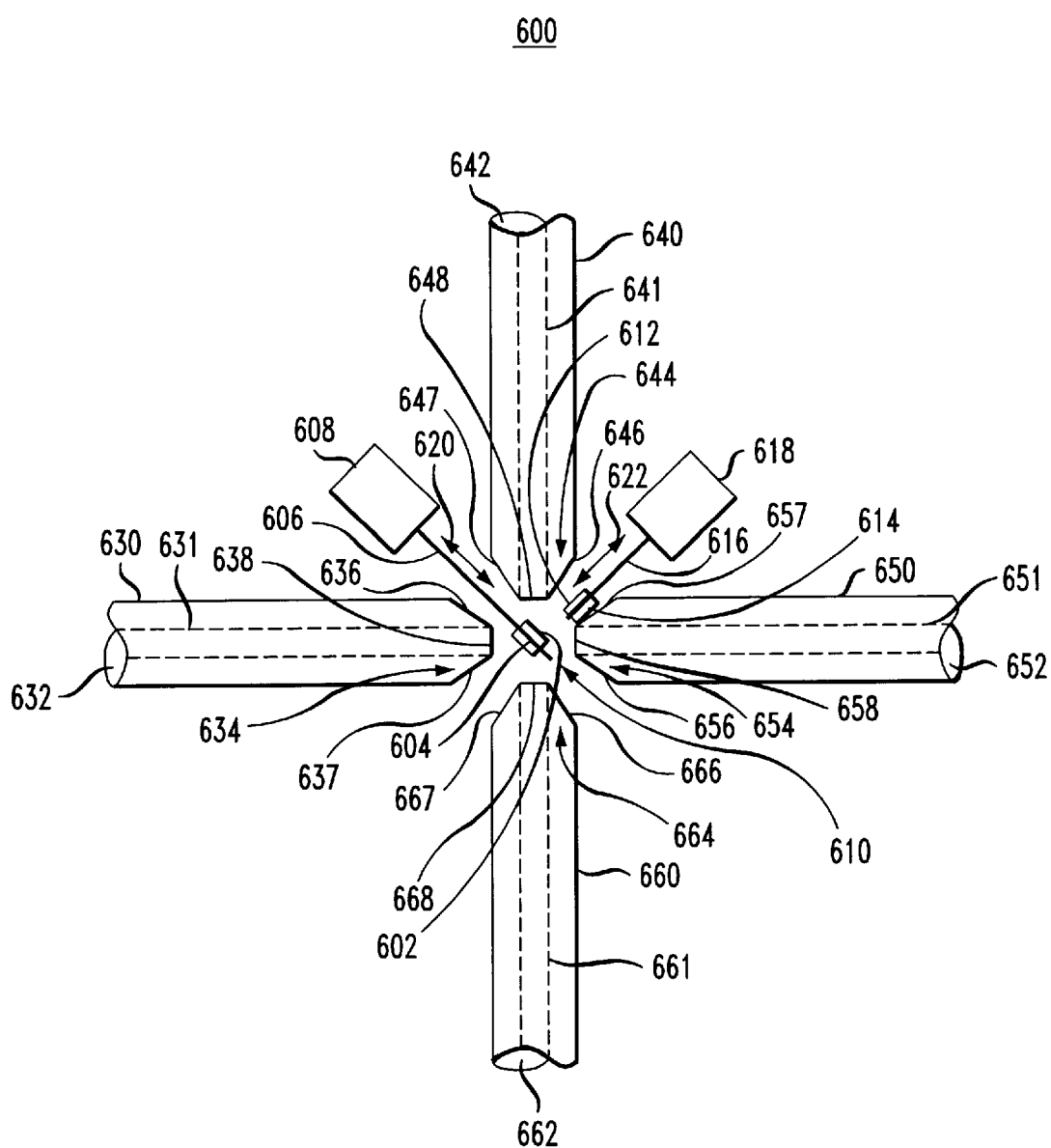
FIG. 6 depicts a schematic diagram of the two-by-two optical switch with tapered fiber ends.

Thus, signal S2 can be directed to any one of the three destination fibers 530, 550 or 560. Fiber 560 is accessed by keeping both signal directors out of the path of signal S2; fiber 550 is accessed by introducing signal director 502 into the signal path; and fiber 530 is accessed by introducing signal director 512 into the path of signal S2. Optical switch 100 depicted in FIG. 1 suitably functions as a 1×3 switch. By adding an additional two signal directors, such a switch can function as a 2×2 switch. In a 2×2 switch, two optical signals that are sourced, one each, from two source fibers, can be directed to either one of two destination fibers. FIG. 6 depicts an illustrative embodiment of such a 2×2 switch. Switch 600 includes four signal directors; signal directors 602 and 604 are disposed on opposite sides of linkage 606, and signal directors 612 and 614 are disposed on opposite sides of linkage 616. Actuator 608 drives linkage 606 and actuator 618 drives linkage 616. Switch 600 is otherwise identical in structure to switch 100, including four fibers 630, 640, 650 and 660, each having respective tapered ends 634, 644, 654 and 664.

Figure 7A:
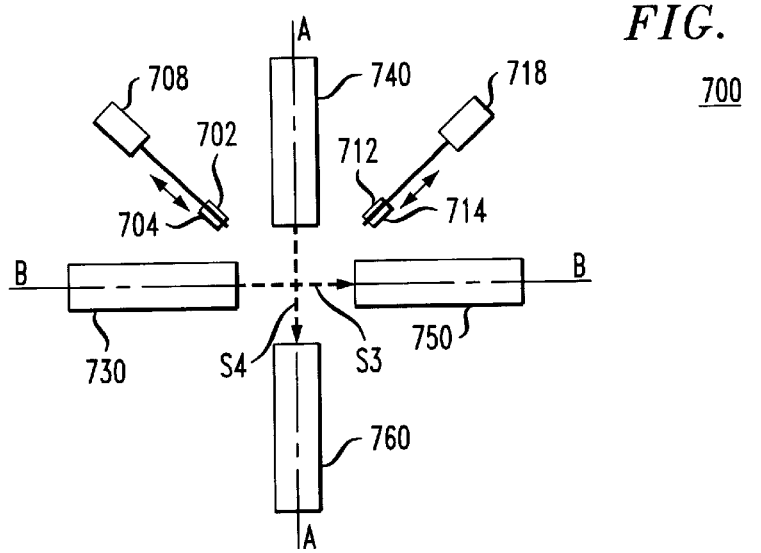
FIG. 7a depicts a conceptual drawing of the two-by-two optical switch of FIG. 6, wherein a first optical signal crosses the switch between a first pair of opposed waveguides and a second optical signal crosses the switch between a second pair of opposed waveguides.
Figure 7B:
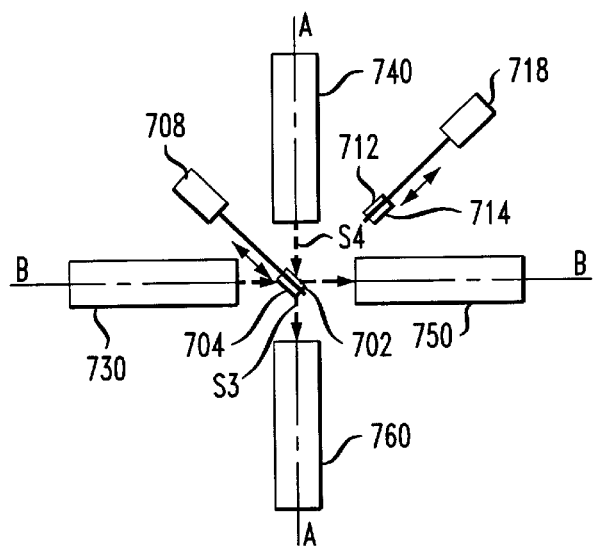
FIG. 7b depicts a conceptual drawing of the two-by-two optical switch having adjacent source waveguides, wherein the paths of two optical signals are changed via contact with a first pair of optical devices.
Figure 7C:
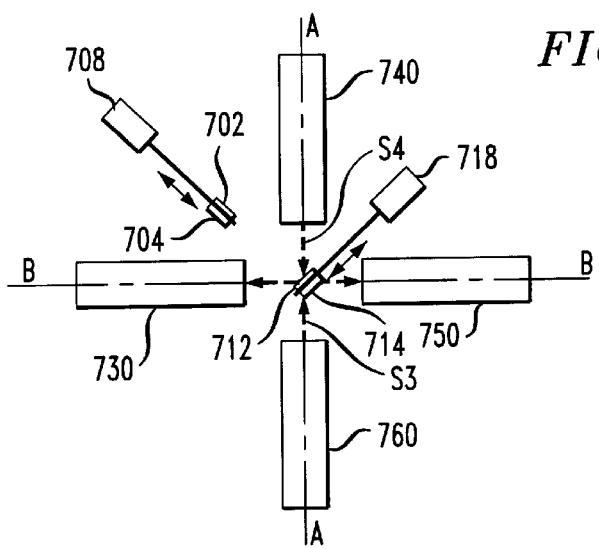
FIG. 7c depicts a conceptual drawing of the two-by-two optical switch having opposed source waveguides, wherein the paths of two optical signals are changed via contact with a second pair of optical devices.

The operation of optical switch 600 is described in conjunction with FIGS. 7a–7c. FIG. 7a depicts optical signal S3 traveling unimpeded along optical axis B—B from source fiber 730 to a destination fiber 750 and optical signal S4 traveling unimpeded along optical axis A—A from source fiber 740 to destination fiber 760. Optical signals S3 and S4 cross switch 600 because the signal directors are out of the optical paths of the signals.

In FIG. 7b, signal directors 702 and 704 are introduced into the paths of signals S4 and S3, respectively. Signal director 702 intercepts signal S4 and redirects at least a portion of it from its original path, which was towards fiber 760, to a new path along optical axis B—B towards fiber 750. Signal director 704 intercepts signal S3 and redirects at least a portion of it from its original path, which was towards fiber 750, to a new path along optical axis A—A towards fiber 760.

In the illustrative examples depicted in FIGS. 7a and 7b, signals S3 and S4 are sourced from fibers 730 and 740. It should be understood that signal directors 702 and 704 can be used for redirecting signals sourced from other pairs of fibers, as well. In particular, signal directors 702 and 704 can be used for redirecting signals from the following fiber pairs: fibers 730 and 740; fibers 740 and 760; fibers 730 and 750; and fibers 750 and 760. When signals are sourced from fibers 740 and 750, only signal director 702 is required for redirecting both signals. When signals are sourced from fibers 730 and 760, only signal director 704 is required for redirecting both signals.

In FIG. 7c, signal directors 702 and 704 have been removed from the paths of optical signals S4 and S3, and signal directors 712 and 714 are introduced therein. Signal S4 is sourced from fiber 740 and signal S3 is sourced from fiber 760. Signal director 712 intercepts signal S4 and redirects at least a portion of it from its original path, which was towards fiber 760, to a new path along optical axis B—B towards fiber 730. Signal director 714 intercepts signal S3 and redirects at least a portion of it from its original path, which was towards fiber 740, to a new path along optical axis B—B towards fiber 750.

In addition to redirecting signals sourced from fibers 740 and 760, signal directors 712 and 714 can be used for redirecting signals from the following fiber pairs: fibers 740 and 750; fibers 730 and 750; and fibers 730 and 760. When signals are sourced from fibers 730 and 740, only signal director 712 is required for redirecting both signals S3 and S4. Similarly, when signals are sourced from fibers 750 and 760, only signal director 714 is required for redirecting both signals.

The structure and operation of several illustrative examples of optical switches in accordance with the present teachings have been described above. A detailed description of the structure, operation and fabrication of actuators suitable for moving the signal directors into and out of the path of the optical signals is now presented.

Figure 8A:
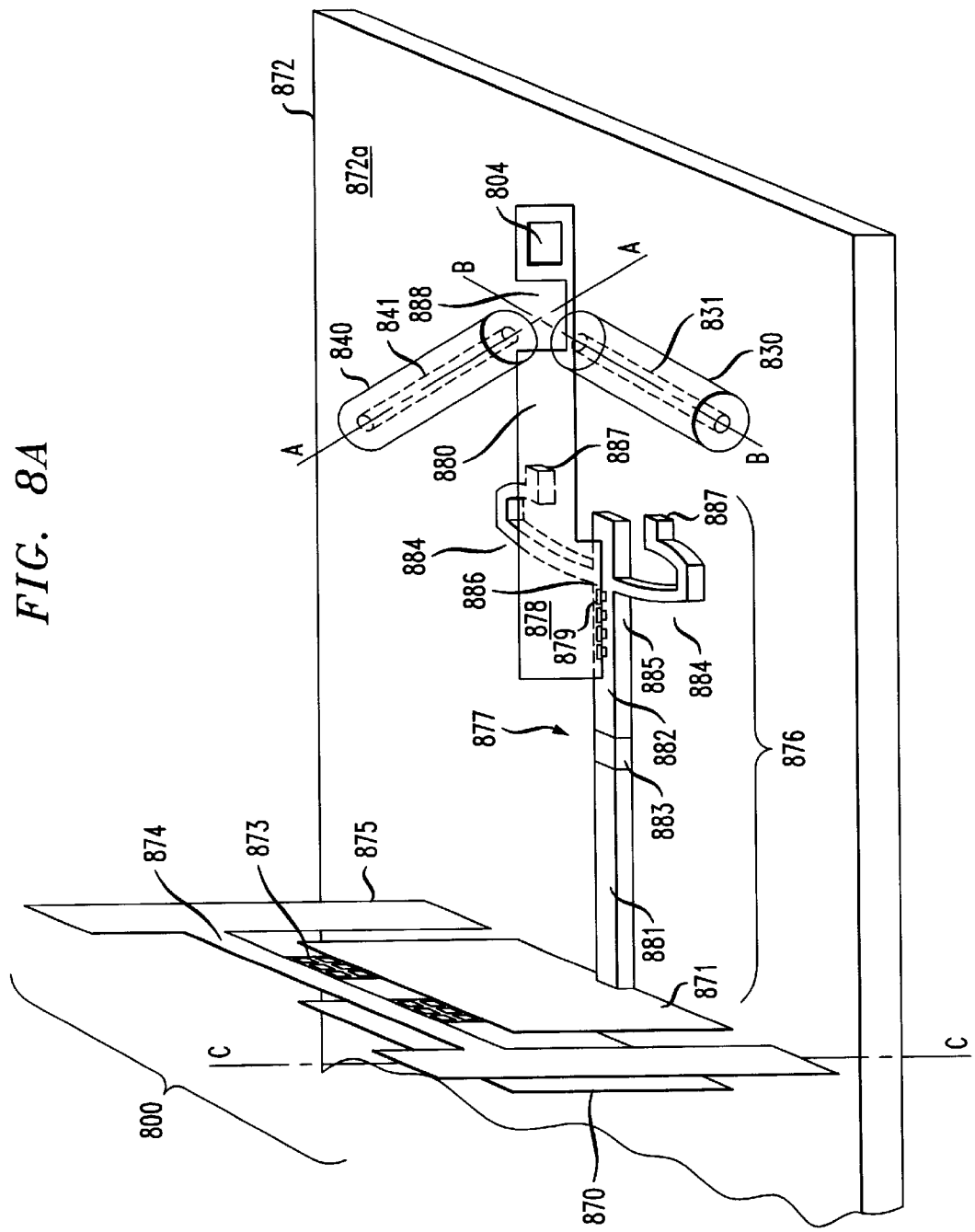
FIG. 8a depicts a schematic diagram of an in-plane actuator for the one-by-three and the two-by-two optical switches.
Figure 9:
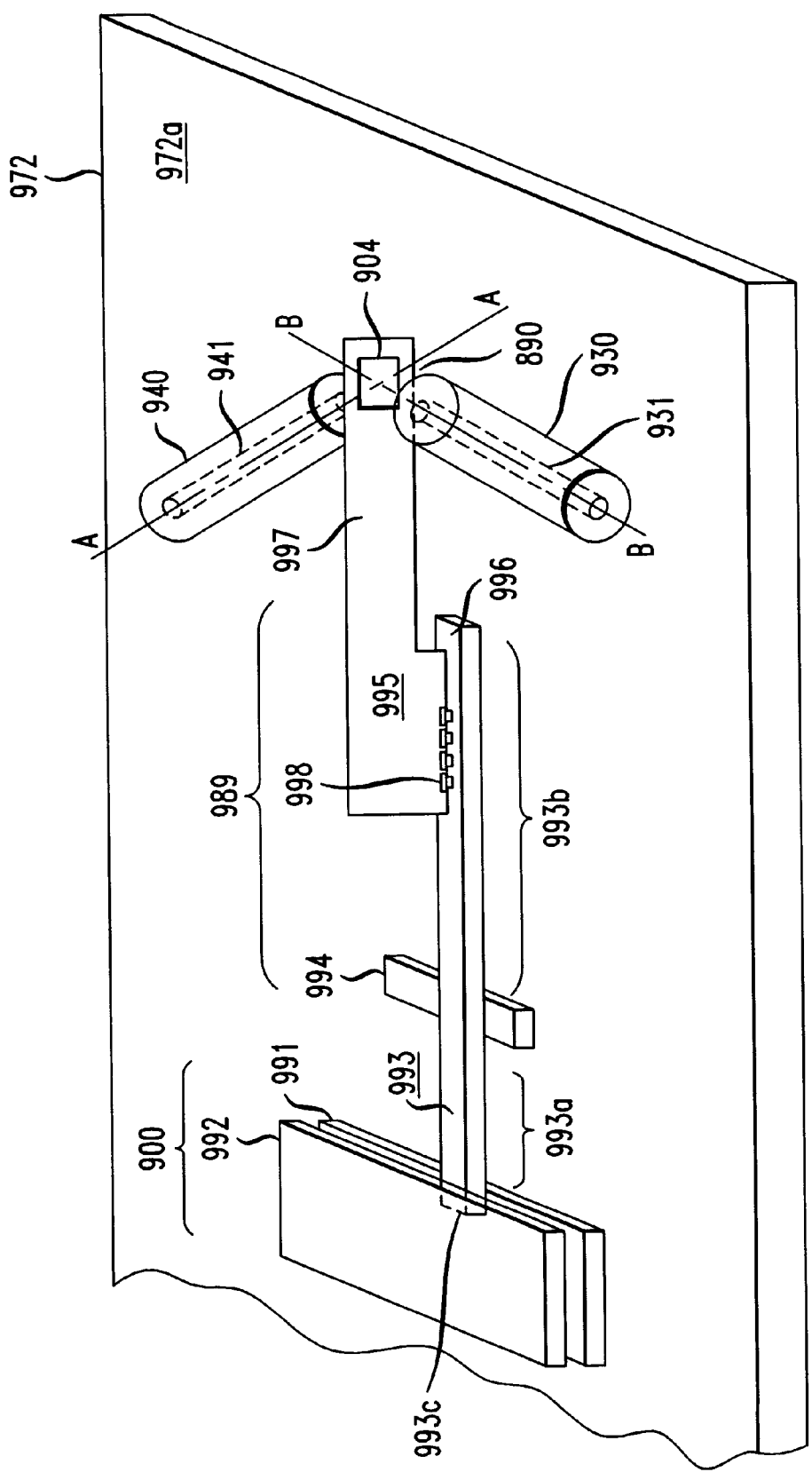
FIG. 9 depicts a schematic diagram of an out-of-plane actuator for the one-by-three and the two-by-two optical switches.

FIG. 8a depicts a first illustrative embodiment of actuator 800 suitable for use as actuators 108 and 118 depicted in FIG. 1, actuators 508 and 518 depicted in FIGS. 5a–5c, actuators 608 and 618 depicted in FIG. 6, and actuators 708 and 718 depicted in FIGS. 7a–7c. A second embodiment of actuator 900 suitable for use as such above-mentioned actuators is depicted in FIG. 9. For the purposes of simplicity and clarity only two waveguides, one actuator and one linkage are depicted in FIGS. 8a and 9.

Referring to FIG. 8a, actuator 800 comprises several hinged plates. Forming such hinged plates is known in the art. See, Pister et al., "Mircofabricated Hinges," vol. 33, Sensors and Actuators A, pp. 249–56, 1992. See also assignee's co-pending patent applications MICRO MACHINED OPTICAL SWITCH, filed May 15, 1997 as Ser. No. 08/856, 569; and METHODS AND APPARATUS FOR MAKING A MICRODEVICE, filed May 15, 1997 as Ser. No. 08/056, 565, both of which applications are incorporated by reference herein.

Illustrative actuator 800 of FIG. 8a is configured to provide "in-plane" switching, and illustrative actuator 900 of FIG. 9 is configured to provide "out-of-plane" switching. As used herein, the terms "in-plane", horizontal, "out-of-plane" and vertical reference a direction or location relative to the surface of the support upon which the optical switch resides. For example, in-plane or horizontal movement refers to movement in a direction parallel to the surface of the support.

"In-plane" actuator 800 of FIG. 8a has a fixed electrode 870 and a movable electrode 871 that are spaced from one another. Fixed electrode 870 is preferably hinged (hinges not shown) to support 872, and a support plate (not shown) is used to support fixed electrode 870 in an upright or out-of-plane position. Fixed electrode 870 is connected to a controlled voltage source (not shown) via a conductor (not shown). Fixed electrode 870 and movable electrode 871 are suitably spaced so that upon application of voltage via the controlled voltage source, an electrostatic attraction is developed between the electrodes sufficient to cause movable electrode 871 to swing towards fixed electrode 870.

Movable electrode 871 is suspended by suspension means 873, which are shown as hinges, from cross member 874 of frame 875. The suspension means 873 is suitably configured to allow movable electrode 871 swing towards fixed electrode 870. Frame 875 is hinged to support 872 by hinges (not shown) and secured in an out-of-plane position by supports (not shown).

In the embodiment shown in FIG. 8a, a linkage 876 consists of a hinged sled 877 and an optical device support 878 which is hinged to sled 877 via hinges 879. Optical device support 878 includes a projection 880 upon which optical device 804 is disposed. Optical support device 878 is fixed in an upright, out-of-plane position as required for it to project between optical waveguides 830 and 840 by support means (not shown), and, optionally by gluing hinges 879.

As formed, hinged plates, such as optical device support 878, lie flat on or near the surface of the substrate. Thus, assembling a structure from such plates requires rotating them about their hinges, out of the plane of the substrate. Typically, some of the hinged plates will be rotated by ninety degrees and others by a lesser amount. See assignee's co-pending patent application SELF-ASSEMBLING MICRO-MECHANICAL DEVICE, filed Dec. 22, 1977 as Ser. No. 08/997,175, incorporated by reference herein.

Sled 877 consists of a first member 881 that is linked or attached to movable electrode 871 and a second member 882 to which optical device support 878 is attached. First and second members 881 and 882 are interconnected via hinge 883, which functions as an out-of-plane decoupler. In other words, hinge 883 allows first member 881 to move, in an out-of-plane direction, independently of second member 882. This ensures that movement of optical device 804 into and out of the optical path is not affected by any out-of-plane component of motion imparted to first member 881 as a result of the motion of movable electrode 871 as it swings towards and away from fixed electrode 870.

Projection 880 of optical device support 878 is situated in space 869 between optical fibers 830 and 840. As depicted in FIG. 8a, optical fibers 830 and 840 are disposed on support 872. It should be appreciated, however, that optical fibers 830 and 840 may be disposed on a support different than support 872. When actuator 800 is actuated (i.e., voltage is applied), movable electrode 871 is drawn towards fixed electrode 870. As a result, sled 877 moves away from the intersection of axes A—A and B—B coinciding with the optical path defined by optical cores 831 and 841 (i.e., the sled moves towards the left in FIG. 8a).

Figure 8B:
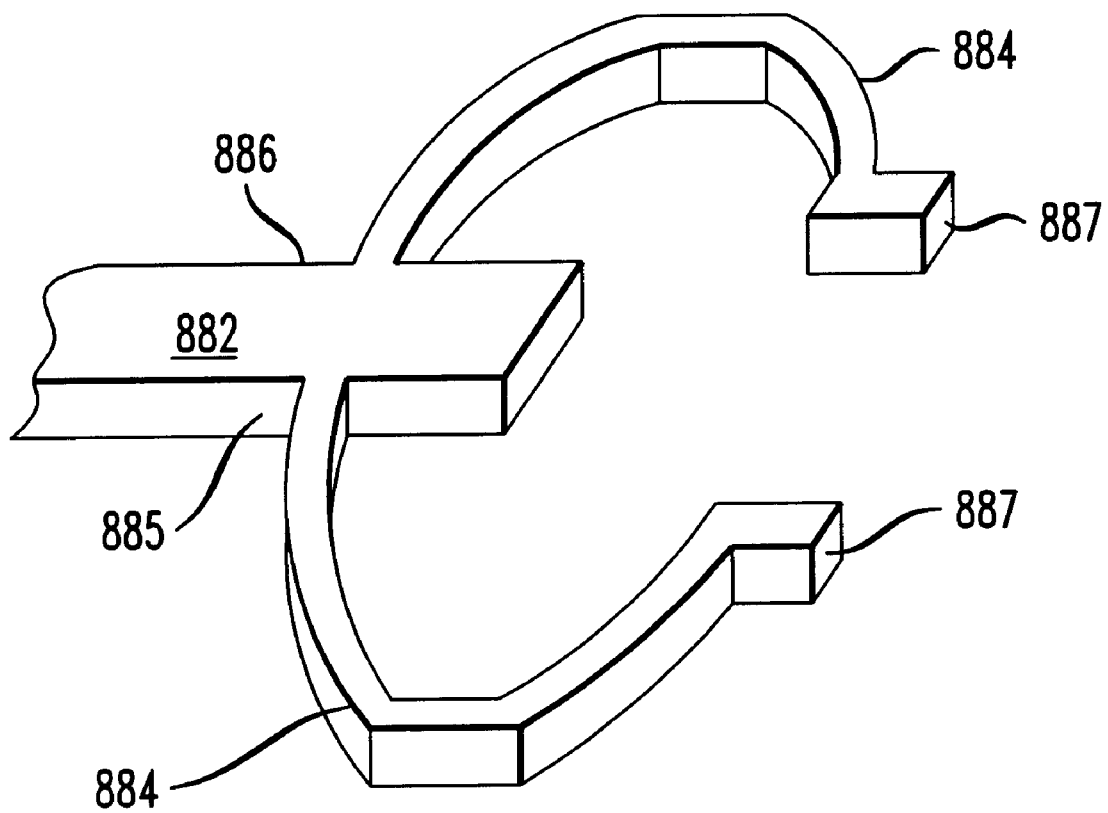
FIG. 8b depicts a schematic diagram of the springs of the in-plane actuator in an actuated state.

A structure suitable for providing a restoring force, such as springs 884, are attached to edges 885 and 886 of second member 882 and attached to substrate 872 at spring ends 887. In the actuated state springs 884 are deformed as depicted in FIG. 8b. Once the actuating voltage is removed, springs 884 provides a restoring force or bias to return sled 877 to its unactuated position, as depicted in FIG. 8a. In such a state, movable electrode 871 hangs substantially vertically along axis C—C. It can be seen that as actuator 800 goes from the actuated state to the unactuated state, sled 877 will move toward the intersection of axes A—A and B—B. The spacing between electrodes 870 and 871 is set so that in the unactuated state optical device 804 does not intersect the optical path and in the actuated state optical device 804 does intersect the optical path.

It should be appreciated that the optical switch can be configured so that optical device 804 is at a first position (in the optical path) when actuator 800 is unactuated, and at a second position (out of the optical path) when actuator 800 is actuated, or vice versa. As depicted in FIG. 8a, notch 888 can be positioned at the first position when actuator 800 is unactuated to position optical device 804 at the second position. It should also be appreciated that actuator 800 must impart sufficient in-plane motion to optical device 804 to allow another optical device, which is situated on another linkage, to move into the optical path when optical device 804 is out of the optical path.

In the illustrative embodiment of the present invention for the two-by-two optical switch 600, the optical devices actuated by one of the actuators will typically be within the optical path while the optical devices of the other actuator will typically be out of the optical path. Also, one of the actuators is typically in its actuated state while the other actuator is in the unactuated state. It should be appreciated, however, that the optical switch can be configured to permit synchronous actuation of the two actuators.

The in-plane actuator 800 of FIG. 8a is not limited to the use of a single fixed electrode and a single movable electrode. Multiple fixed and movable electrodes may be configured as interdigitated fixed and movable teeth members. An actuator with such interdigitated fixed and movable teeth members is often referred to as a "comb" drive and is ell known in the art.

FIG. 9 depicts of out-of-plane actuator 900, linkage 989 and optical device 904. Optical fibers 930 and 940 are disposed on support 972. It should be appreciated, however, that optical fibers 930 and 940 may be disposed on another support different from support 972. Linkage 989 mechanically links or interconnects actuator 900 to optical device 904. In an unactuated state, linkage 989 is situated substantially parallel to surface 972a and passes through gap 890 between optical waveguides 930 and 940. Linkage 989 and optical device 904 are positioned relative to waveguides 930 and 940 so that optical device 904 is movable between a first position that is in the path of an optical signal traveling between optical waveguides 930 and 940 and a second position that is out of the optical path between optical waveguides 930 and 940.

Actuator 900 imparts a vertical or out-of-plane motion to linkage 989, and optical device 904 therefore moves in a substantially "up-and-down" or vertically reciprocating motion into and out of the optical path. It should be appreciated that the optical switch can be configured so that optical device 904 is at a first position (in the optical path) when actuator 900 is actuated, and at a second position (out of the optical path) when actuator 900 is not actuated, or vice versa. It should also be appreciated that actuator 900 must impart sufficient vertical motion to optical device 904 to allow another optical device, which is situated on another linkage, to move into the optical path when optical device 904 is out of the optical path.

Actuator 900 includes two conductive surfaces or electrodes: movable plate electrode 992 and fixed electrode 991. Movable plate electrode 992 is suspended by a flexible support (not shown) over fixed electrode 991 that is disposed on surface 972a of substrate 972. Movable plate electrode 992 may be fabricated from doped polysilicon or other conductive materials. Fixed electrode 991 may be fabricated from doped polysilicon or other conductive materials, or alternatively, substrate 972 may be suitably doped to render a region thereof conductive to function as fixed electrode 991.

Linkage 989 includes beam 993 disposed on a fulcrum 994. Fulcrum 994 is fixed to substrate surface 972a, and divides beam 993 into a first part 993*a* and a second part 993*b*. Beam 993 underlies a portion of movable plate electrode 992 at beam end 993*c*. Beam end 993*c* is mechanically connected (connection not shown) or mechanically engaged to such portion of movable plate electrode 992. A flexible suspension means (not shown) may be used to secure beam 993 to substrate surface 972*a*.

In one embodiment, optical device support 995 is attached to beam 993 near beam end 996. Optical device support 995 includes a projection 997 upon which optical device 904 is disposed. In some embodiments optical device support 995 is hinged to beam 993 via hinges 998 and held by supports (not shown) in an upright out-of-plane position as required for it to project between waveguides 930 and 940.

Electrodes 992 and 991 of plate actuator 900 are in electrical contact with a voltage source (not shown). When a voltage is applied across plate actuator 900, an electrostatic attraction is developed between movable plate electrode 992 and fixed electrode 991. Such attraction causes movable electrode 992 to move downwardly towards fixed electrode 991. As movable electrode 992 moves downwardly, first part 993*a* of beam 993 is forced downwardly towards substrate surface 972*a*. Due to the presence of fulcrum 994, second part 993*b* of beam 993 moves upwardly as first part 993*a* moves downwardly, in the manner of a "seesaw" or "teeter." By suitably selecting the distance between fulcrum 994 and optical device 904, the optical device is caused to move into, and out of, the optical path defined by fiber cores 931 and 941 as a function of the oscillatory motion of plate electrodes 992 and 991. Additionally, by suitably positioning fulcrum 994 near fixed electrode 991 and by suitably setting the relative length of first part 993*a* to second part 993*b*, the optical device is lifted sufficiently away from the optical path to permit a second optical device, driven by a second actuator, to move into and out of the optical path.

In the embodiment pictured in FIG. 9, the optical device moves out of the optical path as bias is applied. It will be appreciated that in other embodiments, the optical switch can be configured so the optical device moves into the optical path when bias is applied. Plate electrodes 991 and 992, hinges and various support plates comprising the out-of-plane optical switch can be fabricated and assembled as described for the 'in-plane' optical switch.

Although FIGS. 8*a* and 9 depict a single optical device, it will be clear to those skilled in the art that the two optical devices can be fixed on opposite surfaces of the optical device support. In such a manner the aforedescribed in-plane and out-of-plane actuators can be use for 2×2 optical switches.

It is to be understood that the above-described embodiments are merely illustrative of the invention and that many variations may be devised by those skilled in the art without departing from the scope of the invention. It is therefore intended that such variations be included within the scope of the following claims and their equivalents.

What is claimed is:

1. An optical switch comprising:

four optical waveguides each having a tapered end comprising two tapered edges and disposed on a support such that each tapered edge of each waveguide is in opposed and near-abutting relation with a tapered edge of another optical waveguide, said near abutment defining a space between each pair of opposed tapered edges;

a first electromechanical actuator operable to move at least a first optical device into and out of a path of an optical signal travelling between two of the waveguides, wherein the first optical device moves in the space between a first pair of opposed tapered edges; and a second electromechanical actuator operable to move at least a second optical device into and out of the path of the optical signal, wherein the second optical device moves in the space between a second pair of opposed tapered edges, wherein one tapered edge of the first pair and one tapered edge of the second pair are common to one of the optical waveguides.

2. The optical switch of claim 1 wherein the tapered ends of two of the four waveguides are in opposed relation and define a first gap therebetween, and the tapered ends of the other two of the four waveguides are in opposed relation and define a second gap therebetween, and further wherein the first gap and the second gap are substantially equal.

3. The optical switch of claim 1 wherein the first and second electromechanical actuators and the four waveguides are disposed on a first surface of the support.

4. The optical switch of claim 1 wherein the first actuator comprises:

a movable conductive plate;

a fixed conductive plate, the fixed and movable plates suitably placed to support an electrostatic charge therebetween operable to cause the movable conductive plate to move towards the fixed conductive plate; and a linkage in mechanical communication with the movable plate and the first optical device, wherein, the linkage moves when the movable conductive plate moves, said linkage movement causing the optical device to move from a first unactuated position to a second actuated position.

5. The optical switch of claim 4 wherein the optical device moves in a plane substantially parallel to a first surface of the support.

6. The optical switch of claim 4 wherein the optical device moves in a plane substantially orthogonal to a first surface of the support.

7. The optical switch of claim 4 wherein the first unactuated position of the optical device is out of the path of the optical signal, and the second actuated position in the optical device is in the path of the optical signal.

8. The optical switch of claim 4 wherein the first unactuated position of the optical device is in the path of the optical signal, and the second actuated position of the optical device is out of the path of the optical signal.

9. An optical switch comprising:

four optical waveguides each having a tapered end comprising two tapered edges and disposed on a support such that each tapered edge of each waveguide is in opposed and near-abutting abutting relation with a tapered edge of another optical waveguide, said near abutment defining a space between each pair of opposes tapered edges;

a first electromechanical actuator operable to move a first optical device into and out of a path of a first optical signal travelling between two of the waveguides and operable to move a second optical device into and out of a path of a second optical signal traveling between the other two optical waveguides, wherein the first and second optical devices move in the space between a first pair of opposed tapered edges; and a second electromechanical actuator operable to move a third optical device into and out of the path of the first optical signal and operable to move a fourth optical device into and out of the path of the second optical signal, wherein the third and fourth optical devices move in the space between a second pair of opposed tapered edges, wherein one tapered edge of the first pair and one tapered edge of the second pair are common to one of the optical waveguides.

10. The optical switch of claim 9 wherein the tapered ends of two of the four waveguides are in opposed relation and define a first gap therebetween, and the tapered ends of the other two of the four waveguides are in opposed relation and define a second gap therebetween, and further wherein the first gap and the second gap are substantially equal.

11. The optical switch of claim 9 further comprising two optical device supports, wherein the first and second optical devices are disposed on opposite sides of the one optical device support and the third and fourth optical devices are disposed on opposite sides of the other optical device support.

12. The optical switch of claim 9 wherein the first and second electromechanical actuators and the four waveguides are disposed on a first surface of the support.

13. The optical switch of claim 9 wherein the first actuator comprises:

a movable conductive plate;

a fixed conductive plate, the fixed and movable plates suitably spaced to support an electrostatic charge therebetween operable to cause the movable conductive plate to move towards the fixed conductive plate; and a linkage in mechanical communication with the movable plate and the first optical device, wherein, the linkage moves when the movable conductive plate moves, said linkage movement causing the optical device to move from a first unactuated position to a second actuated position.

14. The optical switch of claim 13, wherein the optical device moves in a plane substantially parallel to a first surface of the support.

15. The optical switch of claim 13, wherein the optical device moves in a plane substantially orthogonal to a first surface of the support.

16. The optical switch of claim 13 wherein the optical devices in the first unactuated position are out of the path of the optical signal, and the optical devices in the second actuated position are in the path of the optical signal.

17. The optical switch actuator of claim 13 wherein the optical devices in the first unactuated position are in the path of the optical signal, and the optical devices in the second actuated position are out of the path of the optical signal.

* * * * *